United States Patent [19]

Garwin et al.

[11] Patent Number: 4,845,684
[45] Date of Patent: Jul. 4, 1989

[54] ACOUSTIC CONTACT SENSOR FOR HANDWRITTEN COMPUTER INPUT

[75] Inventors: Richard L. Garwin, Scarsdale; James L. Levine, Yorktown Heights; Michael A. Schappert, Fishkill, all of N.Y.

[73] Assignee: International Business Machines Corporation, Armonk, N.Y.

[21] Appl. No.: 939,383

[22] Filed: Dec. 9, 1986

[51] Int. Cl.⁴ .................................................. G09G 1/00
[52] U.S. Cl. .................................... 367/137; 367/907; 178/18; 364/188; 340/706
[58] Field of Search .................... 367/117, 137, 87, 95, 367/96, 98, 907; 178/18, 19; 340/365 A, 706, 709; 364/190, 188; 455/603; 181/284

[56] References Cited

U.S. PATENT DOCUMENTS

| | | | |
|---|---|---|---|
| 3,134,099 | 5/1964 | Woo | 367/117 |
| 3,156,766 | 11/1964 | Stamps | 367/117 |
| 3,614,992 | 10/1971 | Whitehouse et al. | 181/284 |
| 3,857,022 | 12/1974 | Rebane et al. | 367/907 |
| 3,885,224 | 5/1975 | Klahr | 367/11 |
| 4,012,588 | 3/1977 | Davis et al. | 367/108 |
| 4,317,005 | 2/1982 | de Bruyne | 367/117 |
| 4,398,275 | 8/1983 | Zehner | 367/137 |
| 4,677,428 | 6/1987 | Bartholow | 455/603 |

Primary Examiner—Thomas H. Tarcza
Assistant Examiner—Daniel T. Pihulic
Attorney, Agent, or Firm—Alexander Tognino; Jackson E. Stanland

[57] ABSTRACT

An acoustic contact sensor for handwritten computer input is disclosed herein. The contact sensor comprises ultrasonic sending transducer means, receiving transducer means and circuit means for providing a logic signal to a computer when contact is made. The sending and receiver transducer means can either individually be coupled to a pen stylus or writing and/or display surface.

29 Claims, 3 Drawing Sheets

ACOUSTIC CONTACT SENSOR FOR HANDWRITTEN COMPUTER INPUT

BACKGROUND OF THE INVENTION

1. Field of the Invention

This invention relates to stylus input devices for computer data or information. More particularly, this invention relates to acoustic contact sensing means for said stylus device.

2. Description of Related Art

There are many computer input devices which provide the location of a stylus in a working area. Examples of these devices are data tablets, light pens, and laser scanning devices etc. (For example, see U.S. Pat. Nos. 3,134,099 and 4,564,928, Japanese Patent Nos. 55-39937 and 57-14978; and IBM Technical Disclosure Bulletin, Vol. 12, August 1969, pg. 390). These devices are frequently used to specify single points, for example, to define the ends of lines to be drawn in computer-aided design systems. However, although well suited for the above purposes, these devices are not suitable for handwritten input by use of the stylus.

Some of the principal requirements for acceptable handwritten computer input are a precision of 50-100 points per inch, a data rate exceeding 60 points per second, and a very sensitive mechanism to detect contact between the stylus and the working surface. The contact sensing feature is critical for segmenting the stream of coordinates into strokes typical of handwriting.

In most cases, location sensing techniques which provide adequate precision, detect the stylus at an ill-defined distance from the working surface. A common attempt at a solution to this inadequacy is to add an electrical switch which can be activated by pressing the stylus against the working surface. However, reliable switches require considerable force and/or displacement, making it difficult to write in a natural manner. Conversely, devices with good contact properties, such as surface acoustic wave sensors, do not have adequate resolution and/or data rates. In some cases the contact sensor would be activated in error if the hand touched the writing surface.

It is therefore an object of the present invention to provide an extremely sensitive, high resolution, contact sensing device for handwritten computer input.

It is a further object that said above contact sensing device be adaptable to any number of different coordinate input devices.

SUMMARY OF THE INVENTION

The invention uses simple acoustic phenomena and techniques to provide an extremely sensitive contact sensing device which can be added to almost any coordinate input device. The basic phenomenon exploited is the large difference in acoustic impedance between air and solids. Because of this difference, acoustic waves flowing between two solids can be almost completely blocked by an imperceptible air gap.

In one typical embodiment, a handwriting stylus is to be used with a writing tablet or surface. The contact sensing device comprises an ultrasonic sending transducer coupled to the writing surface and used as a source of acoustic waves. These waves may be bulk or surface waves. In conjunction with said writing surface, a stylus is equipped with a receiving transducer coupled to its tip to receive said transmitted acoustic waves and convert them to electrical signals. These signals from the stylus sensor are then fed to a detection circuit by a cable. The detection circuit provides logic signals to the computer whenever the acoustic signals exceed predetermined threshold values.

In some cases, it may be desirable to avoid the connecting cable. This can be accomplished by equipping the stylus with a wireless link such as a battery operated FM transmitter. Still, another way to eliminate the stylus connecting wire is to reverse the functions of the transducers, using the stylus transducer as the source of ultrasonic waves for reception by a transducer coupled to the writing surface. In this case, a battery powered circuit in the stylus drives the transducer.

BRIEF DESCRIPTION OF THE DRAWINGS

FIG. 5 is a block diagram of a noise detection circuit for use with the embodiments of FIGS. 4A and 4B.

DETAILED DESCRIPTION OF THE INVENTION

Figure 1:
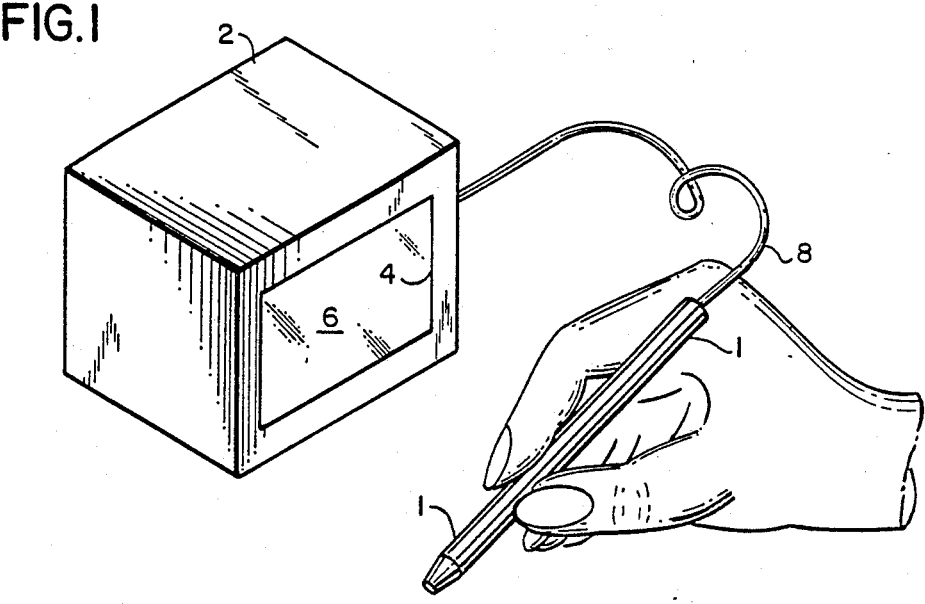
FIG. 1 is an isometric view of one embodiment of a display system according to the present invention wherein a light pen stylus is wired to its companion display.

FIG. 1 is an isometric view of one embodiment for entering commands and data in computer use without using a keyboard. Moreover, these alternative means provide a unique ability to enter handwritten data into a computer. A basic interactive computer display featuring a light pen stylus is depicted in FIG. 1. As shown, the system includes a light pen stylus 1, a computer system 2, a display 4 and a screen 6. Pen 1 is connected to the computer system 2 by means of cabling 8.

Figure 2:
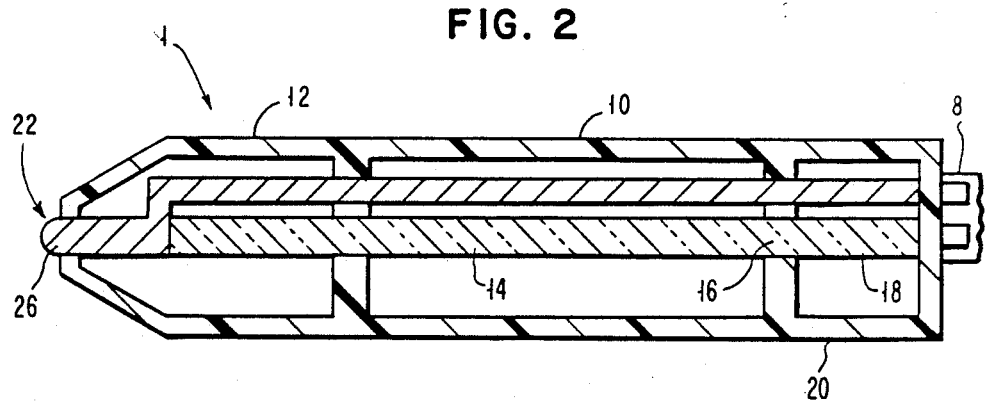
FIG. 2 is a section view of the light pen stylus of FIG. 1 in a plane parallel to the pen's length.

Referring now to FIG. 2, pen 1 is seen to include a generally cylindrical body 10 suitable to be hand held and having the general shape of a pen or pencil. Pen body 10 has a front end 12 in which a principal fiber element or conduit 14 is provided. Conduit 14 is axially mounted in body 10 and maintained in a fixed relation to body 10. Conduit 14 as shown is optically coupled at conduit end 16 to a detector 18 located at end 20 of body 10.

As will be apparent to those skilled in the art, detector 18 could also be located in computer 2 with appropriate optical coupling made by way of cabling 8 without changing the scope and content of the subject invention. It should be appreciated that detector 18 can be any of a number of light detectors for correlating collected light with the raster sweep. In the most general case detector 18 comprises a transducer for receiving light from conduit 14 which then converts the light received into an electrical signal having an amplitude proportional to the light intensity.

Continuing with FIG. 2, the light pen of this invention further includes a contact sensor 22 that provides an indication to the computer system 2 when pen 1 has been placed in engagement with display screen 6. The screen sensor features an acoustic circuit that is independent of the conduit 14 so that determination of screen engagement can be made independently of pen coordination determination.

The screen sensor 22 of the subject invention includes an ultrasonic sending transducer (not shown), and a receiving transducer 26. The optical screen or writing tablet acts as the acoustic conduit that facilitates communication between the sending and receiving units.

In accordance with the embodiment of the contact sensor of FIGS. 1 and 2, transducer 22 is located at the tip of stylus 10 and positioned axially thereof. The sensor could be transparent to light to prevent interference with light signals to conduit 14. Alternatively, the contact sensor 22 could be opaque to light whereby with concentric lenses the incident light could be focussed onto conduit 14. As another option, the optical detection system 14, 16, 18 can be mounted adjacent to the tip and made conductive of acoustic energy. The receiving transducer 26 can then be mounted distal from the tip.

In operation, when stylus 10 is brought into contact with surface 6, transmitted waves from the sending transducer, located at the screen periphery (not shown), are detected by receiving transducer 26 at the end of the stylus. The receiving transducer 26 receives these waves and converts them into an electrical signal. This signal from transducer 26 is fed to a detection circuit located in computer 2 by cable 8. This circuit provides a logic signal to the computer 2 whenever the acoustic signal exceeds a pre-determined threshold value.

In the above modes of operation, reflected waves from the edges of the display screen or writing surface will combine with the transmitted wave to form a standing wave pattern. This will create one or more nodal regions of low amplitude where the stylus signal will be lost. Such standing waves may be suppressed by adding acoustic absorbers or scatterers to the edges of the writing surface. However, this may be expensive or impractical, for example if the surface is the faceplate of a display. As an alternative, short pulses can be used as the transmitted signal with sufficient delay between pulses to allow the reflections to damp out naturally. Another alternative involves repetitive sweeping of the transmitter frequency. This last technique works because the nodal positions depend on frequency. It is also possible to use the transmitter and receiver as a positive feedback oscillator to eliminate the effects of the nodal regions, the system breaking into oscillation at a frequency which may be different at different positions, automatically avoiding a frequency which would give a node.

In the preferred embodiment, the fiber optic light pen stylus with raster position coordinate sensing means of FIG. 1 is replaced by a scanning laser system. As will be recognized by those skilled in the art, with such a scanning laser system, optical conduit 14 is replaced by a sweeping light source, such as a laser, and retro-reflective bands are included on the stylus near its tip. Stylus coordinates can then be determined in the plane of the writing or display surface.

Figure 3:
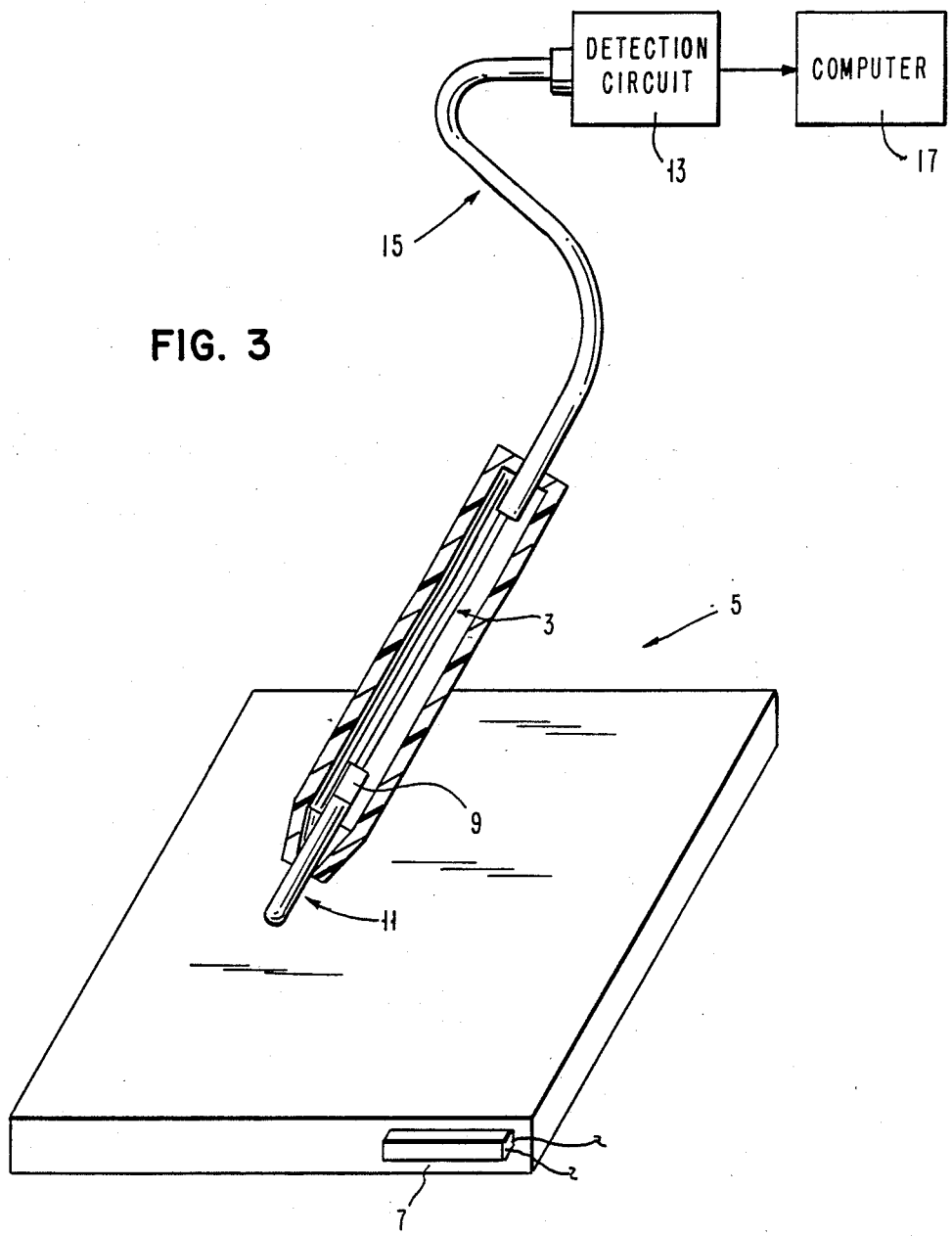
FIG. 3 is an isometric view of a display system according to the present invention wherein the coordinate system for locating said stylus is a light scanning system.

Referring now to FIG. 3, stylus 3 is in contact with writing surface 5. An ultrasonic sending transducer 7 is coupled to the surface and used as a source of acoustic waves. These may be bulk or surface waves. The stylus 3 is equipped with a receiving transducer 9 coupled to its tip 11 to receive these waves and convert them to an electrical signal. This signal from sensor 9 is fed to detection circuit 13 by cable 15. This circuit provides a logic signal to computer 17 whenever the acoustic signal exceeds a pre-determined threshold value.

Figure 4A:
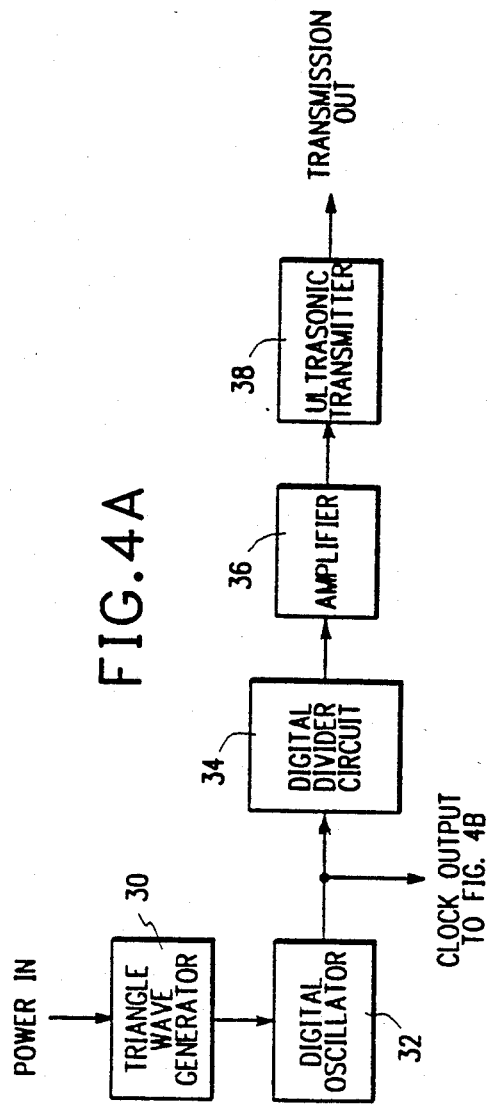
FIG. 4A is a block diagram of the frequency-sweep circuit for the writing surface of FIG. 3.
Figure 4B:
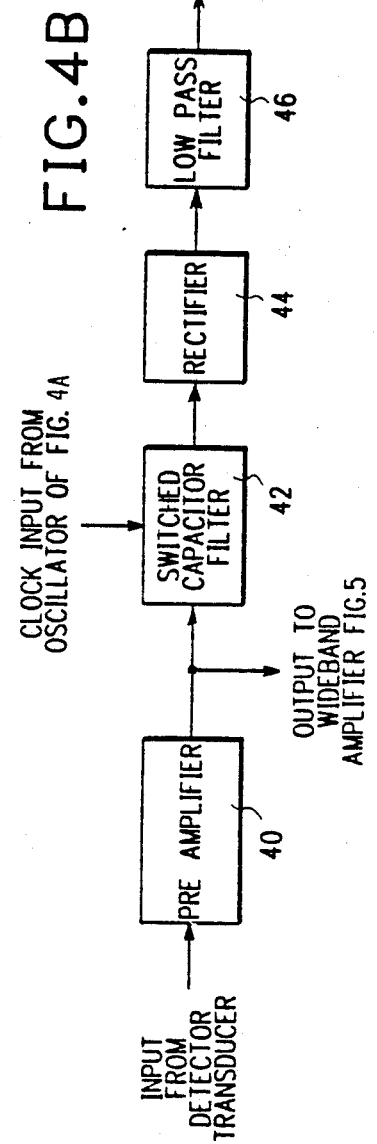
FIG. 4B is a block diagram of the receiver pick-up circuit for the pen stylus embodiment of FIG. 3.

FIG. 4A illustrates a block diagram of a frequency-sweep circuit for the writing surface using the scanning laser system above. The circuit uses switched capacitor tracking filters in the receiver to automatically track the transmitter frequency. The transmitter consists of digital oscillator 32 operating at 100 times the desired ultrasonic frequencies. This frequency is divided by 100 by digital circuit 34 and amplified at 36 to drive the ultrasonic transmitter 38. A low-frequency triangle wave generator 30 modulates the frequency of oscillator 32 to provide the frequency scan. FIG. 4B is a block diagram of receiver or detector pick-up circuit for the pen stylus of FIG. 3. The signal picked-up by the stylus is amplified by pre-amplifier 40 and then fed to the switched-capacitor narrow-band filter 42. The oscillator output 32 serves as the clock input to this filter, which is chosen to have a center frequency 100 times lower than the clock, or exactly equal to the ultrasonic signal. The output of the filter is rectified at 44, low-pass filtered at 46, and compared with a predetermined threshold at 48 to form the stylus contact signal for the computer.

Note that the frequency received by the stylus will differ from the instantaneous filter frequency because of the propagation delay along the surface. The effect of this is a loss of signal, which can be made small by proper choice of bandwidth, sweep rate and tablet size.

During writing, frictional noise between the stylus and writing surface will produce wide-band noise signals which may interfere with the detection circuitry, causing erratic loss of the contact signal. If the writing surface is fairly smooth, the problem may be eliminated with a low-friction writing tip such as Delrin TM or Teflon TM plastic. For rougher surfaces, the rubbing noise itself can be detected and used to sense contact. This can be accomplished by connecting the detection circuit of FIG. 5 to the output of pre-amplifier 40. Referring to FIG. 5, a wide-band amplifier 50 is connected to rectifier 52. This rectified signal is low-pass filtered at 54 and compared with a threshold at 56 to form the contact signal. The rubbing noise will be too small to detect at low writing speeds, wherefore, both circuits are needed. Their individual logic signals are connected to OR gate 58 to form a composite contact signal.

A similar arrangement to that of FIG. 1 is the embodiment wherein the connecting cable is not needed. This can be accomplished by equipping the stylus with a wireless link such as a battery operated FM transmitter.

Another way to eliminate the wire is to reverse the functions of the transducers, using the stylus transducer as the source of ultra sonic waves for reception by transducer. In this case a battery powered circuit in the stylus can drive transducer. It will be appreciated that this method may be unusable if the writing surface, which is much larger than the stylus, is subject to high levels of acoustic noise.

A still further and different embodiment can be configured by eliminating the sending transducer.

In this mode, the stylus transducer is used as the resonant element of an electrical oscillator, for example a marginal oscillator of the type used to detect nuclear magnetic resonance. The circuit losses will increase abruptly when contact is made, leading to a measurable change in oscillation amplitude. A battery powered circuit can be contained within the stylus and the contact signal sent to the computer, for example, by an IR or FM link.

Thus, while the invention has been described with reference to preferred embodiments thereof, it will be understood by those skilled in the art that various changes in form and details may be made without departing from the scope of the invention.

Having thus described our invention, what we claim as new, and desire to secure by Letters Patent is:

1. In a data input system for a computer device wherein at least one means for entering data to said computer utilizes a pen type stylus for handwriting input of said data, an apparatus for sensing contact between said input stylus and a writing surface comprising:
   (a) ultrasonic sending transducer means coupled to the writing surface for projecting acoustic waves onto said writing surface,
   (b) receiving transducer means coupled to said stylus for reception of said acoustic waves from said sending transducer and further means for reception of acoustic rubbing noise produced when said stylus is moved in contact with said writing surface, said receiving transducer means and said further means converting said acoustic waves and noise to a composite electrical signal, and
   (c) circuit means for providing a logic signal to the computer whenever said composite electrical signal exceeds a predetermined threshold value.

2. An apparatus according to claim 1, wherein said stylus is connected to the computer device by a cable means.

3. An apparatus according to claim 1 wherein said stylus is linked to the computer device by a battery operated wireless transmitter.

4. An apparatus according to claim 1 wherein said ultrasonic sending transducer transmits short pulses approximately 50 microseconds in length of duration with delays of approximately 500 microseconds in length between pulses.

5. An apparatus according to claim 1 wherein said writing surface has acoustic absorbers or scatters located at (the edges) of said writing surface.

6. An apparatus according to claim 1 wherein said ultrasonic sending transducer repetitively sweeps the transmitter frequency.

7. An apparatus according to claim 6 wherein said transmitter transducer comprises:
   (a) digital oscillator means for operation at some multiple times the desired ultrasonic frequency,
   (b) divider means for reducing the output of said oscillator means by the said multiplication factor
   (c) amplifier means for driving said transducer and
   (d) low-frequency sweep generator means for modulating the frequency of said means to provide a frequency means.

8. In a data input system for a computer device wherein at least one means for entering data to said computer utilizes a pen type stylus for input of said data, an apparatus for sensing contact between said input stylus and a writing surface comprising:
   (a) ultrasonic sending transducer means coupled to the writing surface for projecting acoustic waves onto said writing surface,
   (b) receiving transducer means coupled to said stylus for reception of said acoustic waves from said sending transducer, and conversion of said acoustic waves to an electrical signal, and
   (c) circuit means for providing a logic signal to the computer whenever said electrical signal exceeds a predetermined threshold value.

wherein said stylus receiving transducer means comprises:
   (a) pre-amplifier means for amplifying the signal pickup by said receiving transducer,
   (b) switched capacitor tracking filter means for tracking the transmitted frequency
   (c) rectifier means for rectifying the output of said tracking means
   (d) low-pass filter means and
   (e) comparator means for comparing said received signal with a predetermined threshold signal.

9. An apparatus according to claim 8 wherein said stylus receiving transducer means further comprises:
   (a) rectifier means connected to the output of said pre-amplifier means
   (b) low-pass filter means for filtering the output of said rectifier means
   (c) comparator means for comparing the output of said low-pass filter means to a predetermined threshold signal.

10. An apparatus according to claim 8 or 9 wherein the output of said respective comparator means are then connected to an OR gate means to form a composite contact signal for the computer.

11. In a data input system for a computer device wherein at least one means for entering data to said computer utilizes a pen type stylus for input of said data, an apparatus for sensing contact between said input stylus and a writing surface comprising:
   (a) ultrasonic sending transducer means coupled to said stylus for projecting acoustic waves across the writing surface,
   (b) receiving transducer means coupled to the writing surface for reception of said acoustic waves from said sending transducer and further means for reception of acoustic rubbing noise produced when said stylus is moved in contact with said writing surface said receiving transducer means and said further means converting said acoustic waves and noise to a composite electrical signal, and
   (c) circuit means for providing a logic signal to the computer whenever said composite electrical signal exceeds a predetermined threshold value.

12. An apparatus according to claim 11, wherein said stylus is connected to the computer device by a cable means.

13. An apparatus according to claim 11 wherein said stylus is linked to the computer device by a battery operated radio transmitter.

14. An apparatus according to claim 11 wherein said ultrasonic sending transducer transmits short pulses approximately 50 microseconds in length of duration with delays of approximately 500 microseconds in length between pulses.

15. An apparatus according to claim 11 wherein said writing surface has acoustic absorbers or scatters located at the edges of said writing surface.

16. An apparatus according to claim 11 wherein said ultrasonic sending transducer repetitively sweeps the transmitter frequency.

17. An apparatus according to claim 16 wherein said stylus transmitter transducer comprises:
   (a) digital oscillator means for operation at some multiple times the desired ultrasonic frequency, (b) divider means for reducing the output of said oscillator means by the said multiplication factor
(c) amplifier means for driving said transducer and
(d) low-frequency sweep generator means for modulating the frequency of said means to provide a frequency means.

18. In a data input system for a computer device wherein at least one means for entering data to said computer utilizes a pen type stylus for input of said data, an apparatus for sensing contact between said input stylus and a writing surface comprising:
(a) ultrasonic sending transducer means coupled to said stylus for projecting acoustic waves across the writing surface,
(b) receiving transducer means coupled to the writing surface for reception of said acoustic waves from said sending transducer and conversion of said acoustic waves to an electrical signal, and
(c) circuit means for providing a logic signal to the computer whenever said electrical signal exceeds a predetermined threshold value,
wherein said receiving transducer means comprises:
(a) pre-amplifier means for amplifying the signal pickup by said receiving transducer,
(b) switched capacitor tracking filter means for tracking the transmitted frequency
(c) rectifier means for rectifying the output of said tracking means
(d) low-pass filter means and
(e) comparator means for comparing said received signal with a predetermined threshold signal.

19. An apparatus according to claim 18 wherein said receiving transducer means further comprises:
(a) rectifier means connected to the output of said pre-amplifier means,
(b) low-pass filter means for filtering the output of said rectifier means,
(c) comparator means for comparing the output of said low-pass filter means to a predetermined threshold signal.

20. An apparatus according to claims 18 or 19 wherein the output of said respective comparator means are then connected to an OR gate.

21. In a data input system for a computer device wherein at least one means for entering data to said computer utilizes a pen type stylus for input of said data, an apparatus for sensing contact between said input stylus and a writing surface comprising:
an electrical circuit means for resonance oscillation of a transducer in said stylus such that upon contact of said stylus to said writing surface there is a change in amplitude or frequency of the oscillation of said transducer,
comparator means for comparing with a predetermined threshold said change in oscillation amplitude or frequency to provide a contact signal indicative of contact between said stylus and said writing surface, and
means for transmitting said contact to said computer device.

22. An apparatus according to claim 21 wherein said contact signal between said stylus and writing surface is sent to the computer device by a wireless link between said stylus and said computer in the infra-red frequency range.

23. A data input system for a computer utilizing a stylus for the input of said data and including an apparatus for sensing contact between said stylus and a writing surface, said apparatus including
ultrasonic sending transducer means for producing acoustic waves across said writing surface,
receiving transducer means coupled to said stylus for reception of said acoustic waves when said stylus contacts said writing surface,
means coupled to said stylus for receiving acoustic rubbing noise when said stylus is moved in contact with said writing surface, and
circuit means for providing a logic signal to said computer when said received acoustic waves or said acoustic rubbing noise exceeds a predetermined threshold value.

24. The system of claim 23, where said sending transducer is excited by the amplified output of said stylus.

25. A data input system for a computer utilizing a stylus for the input of said data and including an apparatus for sensing contact between said stylus and a writing surface, said apparatus including
ultrasonic sending transducer means coupled to said stylus for producing acoustic waves across said writing surface.
receiving transducer means coupled to said writing surface for reception of said acoustic waves when said stylus contacts said writing surface,
means for receiving acoustic rubbing noise produced when said stylus is moved in contact with said writing surface, and
circuit means for providing a logic signal to said computer when said received acoustic waves or said acoustic rubbing noise exceeds a predetermined threshold value.

26. The system of claim 25, where said sending transducer is excited by the outputs of said receiving transducer and said means for receiving acoustic rubbing noise.

27. A data input system for a computer utilizing a stylus for the input of said data and including an apparatus for sensing contact between said stylus and a writing surface, said apparats including:
ultrasonic sending transducer means coupled to said writing medium for producing acoustic waves across said writing surface,
receiving transducer means coupled to said stylus for receiving said acoustic waves when said stylus contacts said writing surface, and for converting said acoustic waves to electrical signals.
feedback means for coupling said electrical signals back to said sending transducer, and
detection circuit means for providing a logic signal to said computer whenever said received acoustic waves exceed a predetermined threshold value.

28. The system of claim 27, further including amplifying means located between said receiving transducer means and said feedback means for amplifying said electrical signals.

29. The system of claim 27, where said sending transducer, said receiving transducer and said feedback means operate as a positive feedback oscillator.

* * * * *